United States Patent [19]

Boos et al.

[11] Patent Number: 4,767,529

[45] Date of Patent: Aug. 30, 1988

[54] NITRO-MODIFIED CHROMATOGRAPHIC SUPPORT MATERIALS

[75] Inventors: Karl S. Boos, Paderborn/Marienloh; Bernd Wilmers, Bestwig; Richard Sauerbrey, Hanover; Eckhard Schlimme, Rastof, all of Fed. Rep. of Germany

[73] Assignee: Merck Patent Gesellschaft Mit Beschränkter Haftung, Darmstadt, Fed. Rep. of Germany

[21] Appl. No.: 53,664

[22] Filed: May 26, 1987

[30] Foreign Application Priority Data

May 27, 1986 [DE] Fed. Rep. of Germany ....... 3617805

[51] Int. Cl.$^4$ ............................................. B01D 15/08
[52] U.S. Cl. ............................ 210/198.2; 210/502.1; 502/402
[58] Field of Search ............... 210/635, 656, 657, 658, 210/659, 198.2, 198.3, 502.1; 502/400, 401, 402, 403, 404; 530/413, 417

[56] References Cited

U.S. PATENT DOCUMENTS

| | | | |
|---|---|---|---|
| 4,111,863 | 9/1978 | Wulff | 502/402 |
| 4,127,730 | 11/1978 | Wulff | 502/402 |
| 4,406,792 | 9/1983 | Glad | 210/656 |
| 4,699,717 | 10/1987 | Riesner | 210/635 |

OTHER PUBLICATIONS

Königsteiner Chromatographie-Tage, Sep. 30–Oct. 2, 1985 (pp. 219–228).

*Primary Examiner*—Ernest G. Therkorn
*Attorney, Agent, or Firm*—Millen & White

[57] ABSTRACT

Chromatographic support materials which are modified with 1-amino-(2′-nitrophenyl-5′-boric acid)-2-hydroxy-3-O-propyl groups are provided, as well as methods for their preparation and use in gel-permeation chromatography and/or in affinity chromatography.

5 Claims, No Drawings

NITRO-MODIFIED CHROMATOGRAPHIC SUPPORT MATERIALS

BACKGROUND OF THE INVENTION

The invention relates to nitro group-containing modified chromatographic support materials, processes for their preparation, and their use for the separation, enrichment and quantitative determination of certain substances in gel-permeation chromatography and/or affinity chromatography.

A process for direct and selective purification and analysis of a total of 18 ribonucleosides in bodily fluids with the aid of a protein-eliminating affinity gel is already known. As chromatographic support material, a globular, hydrophilic vinyl polymer was employed which was modified with m-aminophenylboric acid after epoxidation (Königstein Chromatography Conference, 30.09.-02.10.85, page 219).

However, it has become apparent that the quantitative results of the ribonucleoside analysis were not perfect and a number of important components of bodily fluids could be separated, enriched and determined quantitatively only unsatisfactorily using this support material.

SUMMARY OF THE INVENTION

It is an object of this invention to provide a modified support material which does not have these disadvantages and with which components of biological materials can be analyzed accurately without prior deproteinization. Surprisingly, it has been found that a chromatographic support material modified with nitro group-containing 1-amino-(phenyl-5'-boric acid)-2-hydroxy-3-O-propyl groups has the properties desired.

Upon further study of the specification and appended claims, further objects and advantages of this invention will become apparent to those skilled in the art.

DETAILED DISCUSSION

The invention relates to a chromatographic support material which is modified with 1-amino-(2'-nitrophenyl-5'-boric acid)-2-hydroxy-3-O-propyl groups, preferably a globular, porous gel based on (e.g., formed of) vinyl polymers and modified with 1-((2'-nitro-5'-boric acid)-phenyl-amino)-2-hydroxy-3-O-prop-3-yl groups. Suitable vinyl polymers are well known to those skilled in the art and include all those conventionally employed in the preparation of conventional chromatographic support materials.

The invention furthermore relates to a process for the preparation of chromatographic support materials by successively reacting a hydroxyl group-containing support material with 1-chloro-2,3-epoxypropane and m-aminophenylboric acid, which is characterized in that a nitration is subsequently carried out, and also relates to the use of the support material in gel-permeation chromatography and/or affinity chromatography.

Suitable chromatographic support materials are all support materials which are conventional in chromatography as long as they contain hydroxyl groups, preferably globular, porous gels based on vinyl polymers, such as, for example, polyethylene glycol dimethacrylate copolymers, or also silica gels, agarose etc. The preferred gels based on vinyl polymers (for example Fractogel® TSK, Merck, Darmstadt) have a high mechanical and chemical stability, for example a pH stability in the range 1 to 14, a pressure stability up to 150 bar with negligible volume change, and a good compatibility with organic solvents; the gel can be sterilized. The surface occupancy by affinity ligands is in the range 0.1 to 0.2, preferably 0.15 mmol per gram dry weight of the gel. In general, the physical properties of the gels, e.g., porosity, structure, etc., are otherwise fully conventional and are those of conventional gels used as chromatographic support materials.

The nitro-modified chromatographic support materials according to the invention are prepared by initially reacting the hydroxyl group-containing gels in aqueous suspension with 1-chloro-2,3-epoxypropane, and subsequently reacting the product obtained with an aqueous solution of m-aminophenylboric acid hydrochloride. The support material obtained, modified with 1-amino-(phenyl-5'-boric acid)-2-hydroxy-3-O-propyl groups is subsequently nitrated. This can be accomplished by suspending one part by weight of the modified gel in 20 parts by weight of 40% nitric acid, stirring the mixture, and filtering off, washing and drying the solid product.

The gels prepared according to the invention are highly suitable for gel-permeation chromatography and for affinity chromatography. These combined properties preferably permit group-specific removal and concentration of diol-containing substances from protein-containing solutions under pressures of up to 150 bar. The gels formed are suitable, in particular, for the removal and concentration of catecholamines, natural and modified ribonucleosides, sugars, glycosylated proteins and oligo- and polyribonucleotides from biological materials, such as, for example, serum, urine, liquor cerebrospinalis, bodily secretions and tissue homogenates.

The quantitative determination of various parameters is preferably carried out in combination with a fully-automatic high-performance liquid chromatographic analysis system.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

EXAMPLE 1

Preparation of the support material modified with 1-amino-(2'-nitrophenyl-5'-boric acid)-2-hydroxy-3-O-propyl groups.

1. Epoxidation 1 part by weight of dry powdered polyethylene glycol dimethacrylate copolymer is suspended in 4 parts by weight of bidistilled water, and 1.1 parts by weight of 1-chloro-2,3-epoxypropane are added. The epoxidation proceeds with stirring over 4 hours at 45° C. and a constant pH (9.0). The epoxidized gel is filtered off under suction and washed successively with 4 parts by weight of bidistilled water, 4 parts by weight of methanol, 4 parts by weight of bidistilled water and 4 parts by weight of methanol, and is dried.

2. Reaction with m-aminophenylboric acid 0.13 part by weight of m-aminophenylboric acid hydrochloride is dissolved in 10 parts by weight of bidistilled water, the pH is adjusted to pH 10.5 using 10 mol/l of NaOH, and 1 part by weight of the epoxidized support material is added with stirring. The reaction is carried out over 24 hours at 55° C. The gel obtained is filtered off under suction, washed successively with two portions of 10 parts by weight of bidistilled water and 10 parts by weight of methanol, and is dried.

3. Nitration

In an ice bath, 1 part by weight of the gel obtained according to 2. is suspended in 20 parts by weight of 40% nitric acid, p.A., and the mixture is stirred for 1 hour. The reaction batch is subsequently stirred at room temperature for a further hour, and the nitrated gel is filtered off under suction, rinsed with bidistilled water until neutral, washed with 10 parts by weight of methanol, and dried.

EXAMPLE 2

Quantitative determination of the catecholamines noradrenaline, adrenaline and dopamine from 100 μl of human urine.

The determination is carried out using a high-performance liquid chromatographic analysis system which comprises an automatic sampler (Merck-Hitachi, 655 A-40), two HPLC pumps (Merck-Hitachi, 655 A-11), a preliminary column (dimensions: length 10 to 100 mm, internal diameter 3 to 20 mm) packed with the gel prepared according to Example 1, an analytical separating column (for example LiChrosorb ® RP-18, 7 μm, internal diameter 250×4 mm), an electrically operated high-pressure six-way valve (Krannich, ELV 7000), a detector (for example Fluorimeter, Merck-Hitachi, F-1000), an integrator (Merck-Hitachi, D-2000) and a control module (Merck-Hitachi, LC-controller, L-5000).

The fully-automatic catecholamine analysis using the column-switching technique proceeds in 5 steps:
1. Chemoselective binding and concentration of the catecholamines on the stationary, pressure-stable affinity phase of the preliminary column;
2. quantitative elution of the remaining physiological matrix from the preliminary column;
3. quantitative elution of the catecholamines from the preliminary column and "on-line" transfer of the catecholamines to the downstream analytical column;
4. separation of the catecholamines under isocratic conditions and detection of the native fluorescence;
5. reconditioning of the preliminary column.

The following buffers are used in the analysis system:
For the preliminary column:

0.2M (26.8 g/l) diammonium hydrogen phosphate
10 mM (3.7 g/l) EDTA
pH 8.7, adjusted using 25% ammonia solution
For the analytical column:
0.1M (13.8 g/l) sodium dihydrogen phosphate
5 mM (1.08 g/l) octane-1-sulfonic acid
pH 3.0, adjusted using 20% phosphoric acid.

The analytical results are collated in the following table:

|  | [nmol/ml] $\bar{x} \pm s$ | $VC_S$ (%) | $VC_D$ (%) | $R_t$ [min] $\bar{x} \pm s$ | $VC_S$ (%) | $VC_D$ (%) | R (%) |
|---|---|---|---|---|---|---|---|
| noradrenaline | | | | | | | |
| A | 0.53 ± 0.03 | 5.66 | — | 6.48 ± 0.05 | 0.69 | — | 93.61 ± 4.14 |
| B | 0.47 ± 0.01 | 2.15 | 1.89 | 6.53 ± 0.05 | 0.75 | 1.95 | 99.07 ± 1.24 |
| adrenaline | | | | | | | |
| A | 0.15 ± 0.01 | 6.67 | — | 8.15 ± 0.07 | 0.87 | — | 95.61 ± 3.25 |
| B | 0.20 ± 0.01 | 3.43 | 0.61 | 7.98 ± 0.08 | 0.96 | 2.65 | 96.84 ± 0.93 |
| dopamine | | | | | | | |
| A | 1.90 ± 0.05 | 2.63 | — | 14.98 ± 0.09 | 0.60 | — | 99.93 ± 2.26 |
| B | 1.86 ± 0.06 | 3.25 | 2.76 | 14.87 ± 0.11 | 0.72 | 2.86 | 97.18 ± 0.70 |

A = urine (100 μl), B = Standard;
fluorimetric detection: Excitation 275 nm, emission 330 nm;
VC = Variation coefficient; S = Series (n = 20); D = Day/Day (n = 7)
R = Recovery ($\bar{x} \pm$ VC %); s = Standard deviation The fully-automatic catecholamine analyzer has a short start-up time and analysis time (maximum of 30 minutes) and is distinguished—besides its practicability—by a high selectivity, stability, precision and detection sensitivity. The virtually quantitative recovery rates of the catecholamines analyzed (cf. Table) underline the reliability of the analysis system. The concentration determination of biogenic amines achieves high precision in series and in day/day analysis. In addition, small variation coefficients for the retention times demonstrate the excellent stability of the system (cf. Table).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A chromatographic support material modified with 1-((2'-nitro-5'-boric acid)phenyl-amino)-2-hydroxy-3-O-propyl groups.

2. A chromatographic support material of claim 1, wherein said support material, prior to modification, contains hydroxyl groups.

3. A chromatographic support material of claim 1, wherein said support material is a hydroxyl group-containing chromatographic support material and is a globular, porous gel formed of a vinyl polymer.

4. A chromatographic support material of claim 3, wherein said hydroxyl group-containing support material is formed of a polyethylene glycol dimethacrylate co-polymer and said gel has a surface occupancy by affinity ligands of from about 0.1 to about 0.2 mmol per gram dry weight of the gel.

5. A chromatographic support material of claim 3, wherein said surface occupancy is about 0.15 mmol per gram dry weight of the gel.

* * * * *